May 6, 1969          J. L. BUTLER          3,442,523
ROLLER SKATE WHEEL ASSEMBLY
Filed Feb. 1, 1967
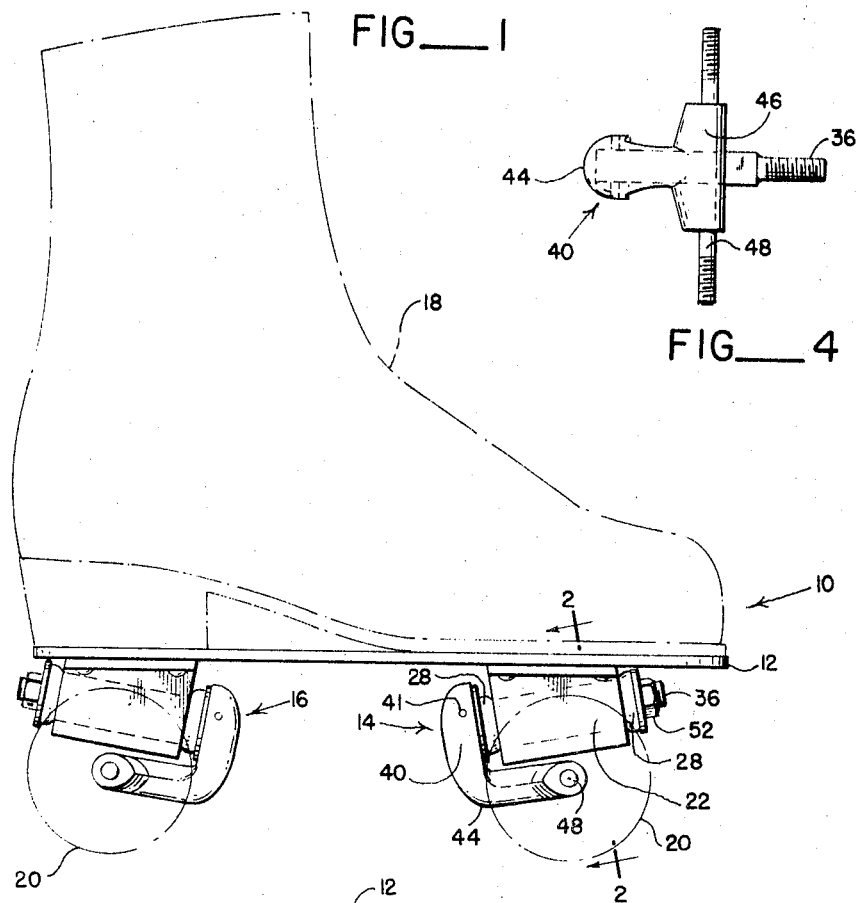
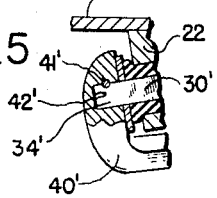
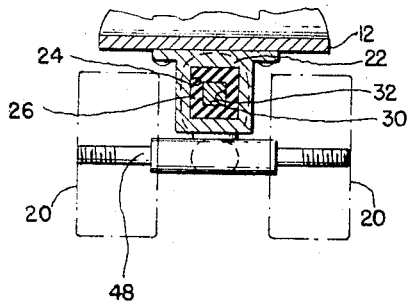
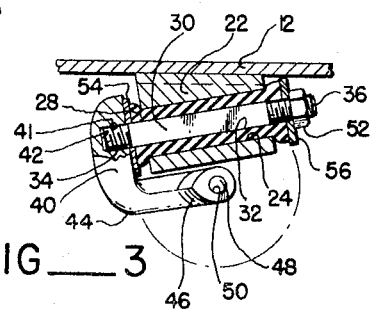
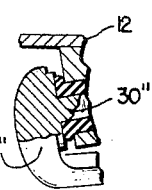
JOHN L. BUTLER
INVENTOR.
BY
*Graybeal, Cole & Barnard*
ATTORNEYS United States Patent Office 3,442,523
Patented May 6, 1969

3,442,523
ROLLER SKATE WHEEL ASSEMBLY
John L. Butler, Anacortes, Wash. 98221
Filed Feb. 1, 1967, Ser. No. 613,234
Int. Cl. A63c 17/02
U.S. Cl. 280—11.28                10 Claims

ABSTRACT OF THE DISCLOSURE

Skate wheel supporting and mounting structure having a hanger member at each end of the shoe plate on the under side. Each hanger member has a bore which extends downwardly and inwardly and which is open at both ends. Inside the hanger member bore is a resilient cushion block which receives a rod or king pin centrally therethrough. At one end of the king pin or rod is secured a truck member to which the axle and wheels are connected. At the other end of the king pin is an adjustment device for regulating the stiffness or resistance of the turning action. The truck and rod are isolated from the hanger so that metal contact between relatively moving metal parts is avoided.

---

A roller skate wheel assembly having a resilient cushion block interposed between the hanger member and the wheel truck in such a manner that no metal-to-metal contact path exists between the roller skate shoe plate and the wheels. The resilient cushion block extends generally horizontally through the hanger member which is attached to the bottom surface of the roller skate shoe plate, and the wheel truck is secured on the outer end of a king pin which extends generally horizontally through the resilient cushion block.

The present invention is directed to a roller skate wheel assembly of the type which incorporates a resilient cushion block between the roller skate shoe plate and the wheel axle support truck, hereinafter referred to as a wheel truck. The resilient cushion block permits tilting or rocking of the shoe plate relative to the wheel truck to facilitate turning the wheels, and serves the additional function of absorbing shock and impact forces which the wheels encounter as they roll over uneven surfaces.

Numerous roller skate wheel mounting structures have been designed in attempts to devise simpler, more efficient and less expensive assemblies, but these have been subject to deficiencies which the wheel assembly of the present invention is designed to overcome. One particular disadvantage is the metal-to-metal contact inherent in the parts when the shoe plate is tilted to effect a turning action of the wheels. As an example see U.S. Patents Nos. 2,553,450 and 2,653,821. In that type of design, the wheel truck is connected to the roller skate shoe plate by both a universally mounted shaft and a resilient cushion block. An adjustment rod is connected to the shoe plate and extends through the resilient cushion block and a portion of the wheel truck for adjusting the compression of the cushion block. This arrangement permits the roller skate shoe plate to tilt or rock relative to the wheels, and such tilting movement being, in theory, resisted and controlled by the variable compression cushion block, but more practically having limited compression or resilient control due to metal-to-metal contact once the cushion block has been slightly deformed.

The types of wheel assembly first described have not proven to be entirely satisfactory for several reasons. In the first place, any shock or impact forces encountered by the wheels will be directly transferred to the shoe plate through both the universally mounted shaft and the adjustment rod. In addition the relatively large number of components in the wheel assembly renders the assembly relatively expensive to manufacture and difficult to repair. This type of construction also limits the useful life of the wheels since the adjustment rod extends below the wheel axle and limits the diameter to which the wheels may be ground down. Another disadvantage of this type of wheel assembly is that two adjustments must be made to regulate the compression of each cushion block. Quite significantly in such prior art devices the wheel truck is movably mounted with respect to a main support member, namely, the king pin, action bolt, rod or bolt, as it is variously termed. See also U.S. Patent No. 2,899,209.

Roller skate wheel assemblies of the type shown in U.S. Patents 321,064 and 2,180,062 do not have universally mounted shafts or adjustment rods extending between the shoe plates and the wheel trucks, but they still include structure which creates metal-to-metal contact paths between the shoe plate and the wheels. Thus, shock and impact encountered by the wheels will be transferred to the shoe plate. Moreover, assemblies of the type shown in U.S. Patent No. 2,180,062 do not provide means for adjusting the compression of the resilient cushion block, and the adjustment means of the type shown in U.S. Patent No. 321,064 is relatively complicated to manufacture and repair.

In the roller skate wheel assembly shown in U.S. Patent No. 2,466,070, the resilient cushion block is disposed in a generally vertically extending hanger or bracket which is mounted on the bottom surface of the shoe plate and the wheel truck or axle sleeve is mounted on the lower portion of a rod which extends through the cushion block. When the skate is at rest with little or no weight on the shoe plate, the cushion block extends slightly below the bottom of the bracket and forms a slight clearance between the bracket and the axle sleeve; thus, no metal-to-metal contact path exists between the bracket and the roller wheels. However, when the skate is being worn, the weight of the skater will compress the cushion block and allow the lower end of the bracket to contact the wheel axle sleeve, thereby establishing a metal-to-metal contact path between the roller wheels and the shoe plate. The lower end of the bracket will also contact the axle sleeve as the skater tilts or rocks the shoe plate toward one side or the other as he executes turning movements thus severely limiting turning action.

In view of the foregoing, it is a feature of the present invention to provide an improved roller skate wheel assembly which is simpler, less expensive to manufacture and repair, and more efficient in operation than the prior art wheel assemblies.

Another feature of this invention is to provide a roller skate wheel assembly which has no metal-to-metal contact path between the roller skate shoe plate and the wheels.

Still another feature of this invention is to provide a skate wheel mounting assembly which has fewer components than heretofore known mounting assemblies and which does not wobble or vibrate if adjustment of the action is loosened excessively.

The foregoing features and other objects and advantages have been realized by the present invention which provides a roller skate wheel assembly comprising a hanger member secured to the bottom surface of a roller skate shoe plate, a resilient cushion block extending generally horizontally through the hanger member, a king pin extending generally horizontally through the resilient cushion block, and a wheel truck secured on one end of the king pin. The wheel truck is provided with a transversely extending axle bore which receives a wheel axle having roller wheels rotatably mounted thereon in a conventional manner. The truck may be detachably secured on the end of the king pin to facilitate replacement thereof, or it may be integrally formed with the king pin. The end of the king pin opposite the end on which the wheel truck is mounted is externally threaded and receives an internally threaded nut which may be tightened or loosened on the king pin to regulate the compression in the resilient cushion block. When the nut is loosened to relieve the compression in the cushion block, the wheel truck becomes less resistant to turning in response to tilting or rocking of the roller skate shoe plate relative to the wheel truck. In addition, the shock and impact absorbing characteristics of the resilient cushion block increase as the compression therein is relieved.

The foregoing and other objects, features and advantages of the invention will be apparent from the following detailed description of preferred embodiments of the invention, as illustrated in the accompanying drawings, wherein:

FIGURE 1 is a side elevation view of a roller skate equipped with a pair of wheel assemblies constructed in accordance with the teachings of the present invention, the roller skate shoe and wheels being shown in phantom lines;

FIGURE 2 is a transverse vertical section taken along the line 2—2 of FIGURE 1 and showing the details of the forward wheel assembly;

FIGURE 3 is a longitudinal vertical section of the forward wheel assembly shown in FIGURES 1 and 2;

FIGURE 4 is a bottom plan view of the wheel truck, wheel axle, and king pin of the forward wheel assembly of FIGURES 1–2;

FIGURE 5 is a fragmentary longitudinal vertical section of a modified form of a wheel assembly constructed in accordance with the teachings of the present invention, wherein the end of the king pin and the hole in the wheel truck which receives the end of the king pin are rectangular in cross-section; and FIGURE 6 is a fragmentary longitudinal vertical section of still another embodiment of the wheel assembly of this invention, wherein the king pin and wheel truck are integral.

Referring now to the embodiments illustrated in the drawings, there is shown in FIGURE 1 a roller skate 10 comprising a shoe plate 12 and front and rear wheel assemblies 14 and 16, respectively, mounted on the bottom surface of the shoe plate 12. The distance between the axles of front and rear wheel assemblies 14 and 16 is the approximate distance between the center of the heel and the center of the ball of the foot of the average user. The roller skate 10 further includes a shoe 18 secured on the top surface of the shoe plate 12 and roller wheels 20 mounted on the wheel assemblies 14 and 16, but these elements form no part of the present invention and are illustrated in phantom lines only.

Wheel assemblies 14 and 16 are identical, so only assembly 14 will be described in detail. As best shown in FIGURES 2 and 3, the wheel assembly 14 includes a hanger member 22 riveted or otherwise suitably secured to the bottom surface of the shoe plate 12. Hanger member 22 has a bore 24 extending generally horizontally therethrough, and a resilient cushion block 26 having enlarged end portions 28, 28 extends through the bore 24. In this preferred embodiment bore 24 is seen to have a slight angle from the horizontal for reasons that will be explained hereinafter. A king pin 30 extends through a bore 32 in resilient cushion block 26 and terminates in externally threaded first and second end portions 34 and 36, respectively. As best shown in FIGURE 2, bore 24 in hanger member 22, bore 32 in resilient cushion block 26, and the middle portions of the cushion block and king pin 30 are all generally rectangular in cross-section to prevent said king pin and cushion block from rotating in their respective bores. Obviously, other configurations which prevent rotation of the elements with respect to one another could be employed.

A wheel truck 40 is detachably secured on the king pin 30 by means of an internally threaded hole 42 in the wheel truck which receives externally threaded first end portion 34 of king pin 30. In order to prevent wheel truck 40 from rotating relative to the king pin 30 and becoming loose, a restraining pin 41 is inserted between the pin end 34 and the peripheral wall of the hole 42. Alternatively, as shown in FIGURE 5, first end portion 34' of king pin 30' and hole 42' in wheel truck 40' may be rectangular in cross-section to prevent relative rotational movement. In this case a restraining pin 41' may be employed to prevent king pin end 34' from sliding longitudinally out of hole 42'.

The wheel truck 40 includes a substantially 90° bend defining a neck portion 44 (FIGURE 3) and a substantially T-shaped axle tree 46 (FIGURE 4). A wheel axle 48 extends through a transversely extending axle bore 50 in the axle tree 46 for rotatably supporting roller wheels 20.

An internally threaded nut 52 is provided on the externally threaded second end portion 36 of king pin 30 for selectively compressing resilient cushion block 26 between washers 54 and 56. Compression of the resilient cushion block 26 may be adjusted to increase or decrease the resistance to tilting or rocking of the shoe plate 12 relative to the wheel truck 40 by simply tightening or loosening nut 52 on threaded king pin end 36.

Obviously, wheel truck 40 may be mounted on either end of king pin 30. Thus, truck 40 may be mounted on second end portion 36 of king pin 30 and nut 52 may be threaded on first king pin end portion 34, if desired.

Either of the detachable fastening constructions between the king pin 30 and the wheel truck 40 shown in FIGURES 3 and 5 permits the truck to be easily and quickly replaced if it is bent or broken. However, it may be desirable to form truck 40'' and king pin 30'' integral as one piece as shown in FIGURE 6. This construction is somewhat less expensive to fabricate and assemble than the constructions of FIGURES 3 and 5, but requires both the king pin and the truck to be replaced if either is broken.

The relatively few number of components in the wheel assembly 14 and the ease with which the components may be assembled render the assembly simpler and less expensive to manufacture and repair than the prior art wheel assemblies. Moreover, there is no structure extending below the wheel axle 48 to limit the diameter to which the roller wheels 20 may be worn down. It will be appreciated by those skilled in the art that the hanger member could be shorter or, stated in another way, the dimensions or proportions shown are not necessarily accurate but are only illustrative. The bottom wall of hanger member 22 could be a detachable or capping piece so that cushion blocks, when replaced, could be slipped in by removal of the cap rather than slidably inserted from one end of the hanger. The truck mounting extending from the king pin may be projected through an opening in the bottom wall of the hanger member. It is thought however that this construction is not practical since cushion material surrounding such depending member would restrict motion of the depending truck piece by compression of cushioning material against the edges of such opening. Preferably then, and as shown, the truck is attached to or formed at one end of the king pin and curved under the hanger. In this way vertical weight components pass through the center of the hanger and cushion block. It should be kept in mind that weight on the axles should be generally centered with respect to the hanger. It will also be seen that the angle at which the hanger member and cushion block support the king pin and truck extends from the outer or shoe plate ends and that it extends inwardly and downwardly at the determined angle. If the king pin and truck are mounted horizontally then rocking the shoe plate does not turn the wheels. Thus, the wedge or angle at which the king pin and truck are disposed within the hanger determines the rapidity of turn or "action". An angle opposite to that shown would result in turning the skate wheels to the side opposite the side to which the shoe plate is depressed.

In use, the skater initially adjusts the compression of the resilient cushion block 26 in each of the wheel assemblies 14 and 16 to set the desired degree of resistance to tilting or rocking of the shoe plate 12 relative to the wheel truck 40. Since there is no metal-to-metal contact path between the shoe plate 12 and the wheel truck 40, virtually no shock or impact forces will be transmitted to the skater's feet as the wheels 20 roll over uneven surfaces. In addition, the absence of any metal-to-metal contact path between the shoe plate and the wheels renders the turning movement smoother as the skater leans to one side or the other to tilt the shoe plate relative to the wheel truck. The result is a generally smoother ride by the skater. The slight angle at which bore 24 in hanger member 22 is disposed to the horizontal may be varied within limits. Basically the angle of the king pin as supported within the hanger and cushion block determines the "quickness" of the skate turning action in response to tilting of the shoe plate.

In the event that truck 40 breaks, bends or otherwise becomes unusable, whether either of the constructions of FIGURES 3 or 5 is employed, truck 40 is removed by simply removing restraining pin 41 or 41' and unscrewing (FIGURE 3 embodiment) or pulling (FIGURE 5 embodiment) truck 40 or 40' off of the end of king pin 30 or 30', and a new truck substituted. If the integral truck and king pin construction of the FIGURE 6 embodiment is used, the adjustment nut 52 (not shown in FIGURE 6) is removed from the end of the king pin 30" and the king pin is slipped out of the resilient cushion block 40". A new king pin and wheel truck may then be incorporated in the assembly.

As can be seen from the foregoing, the present invention provides an improved wheel assembly which is simpler, less expensive to manufacture and repair, and more efficient in operation than the prior art assemblies. While the invention has been described and illustrated herein with reference to preferred embodiments thereof, it will be understood by those skilled in the art that various changes in form and detail may be made therein without departing from the spirit and scope of the invention.

What is claimed is:

1. Wheel mounting assembly for a roller skate wherein said roller skate has a generally horizontally disposed shoe plate, said assembly comprising:
    (a) a hanger member secured to said shoe plate on the under side thereof and having inner and outer ends,
    (b) means defining a first bore generally open at both ends extending from said inner to said outer end through said hanger member generally in alignment with the long axis of said shoe plate and angling generally downwardly from said outer end to said inner end at a predetermined angle off the horizontal,
    (c) a resilient cushion block extending through and protruding from the ends of said first bore in said hanger member and including a second bore extending generally centrally through said cushion block,
    (d) a rod member extending through said second bore and protruding from each end thereof and being isolated from contact with said hanger and shoe plate, and
    (e) truck means secured to one end of said rod member for supportingly receiving axle and wheel means for said skate, said truck means being so secured to said rod that there is no contact by said rod and truck means with said hanger member and shoe plate.

2. The wheel mounting assembly according to claim 1, wherein said truck means is detachably secured on said one end of said rod member and wherein said truck means is designed to assist in compressing said resilient cushion block.

3. The wheel mounting assembly according to claim 1 and wherein said truck means is integrally formed at one end of said rod member.

4. The wheel mounting assembly of claim 3 and wherein said truck means is secured to the inner end of said rod member.

5. The wheel mounting assembly according to claim 4 and wherein said truck means supports said axle and wheel means beneath and generally midway between the ends of said hanger member.

6. The wheel mounting assembly of claim 1 and wherein the ends of said cushion block extend sufficiently out of and beyond the ends of said first bore so that said block may be compressed by the application of pressure to the ends of said block.

7. The wheel mounting assembly according to claim 1 and further including means for adjusting the compression in said resilient cushion block in conjunction with said truck means.

8. The wheel mounting assembly according to claim 7, wherein said means for adjusting the compression in said resilient cushion block includes screw threads on the outer end of said rod member and a cooperating threaded nut means adapted to traverse said threaded portion and selectively compress said cushion block between said nut and said truck means on the inner end of said rod member.

9. The wheel mounting assembly according to claim 1, wherein said first and second bores in said hanger member and said cushion block have a plurality of flat surfaces comprising substantially the same cross section, thereby restricting relative rotational movement of said cushion block and said rod member in their respective bores.

10. Wheel mounting assembly for a roller skate wherein said roller skate has a generally horizontally disposed shoe plate, said assembly comprising:
    (a) a hanger member having upper, lower and side portions and secured by its upper portion to said shoe plate on the under side thereof and also having inner and outer ends,
    (b) means defining a first bore generally open at both ends extending from said inner to said outer end through said hanger member generally in alignment with the long axis of said shoe plate and angling generally downwardly from said outer end to said inner end at a predetermined angle off the horizontal,
    (c) a resilient cushion block extending through and protruding from the ends of said first bore in said hanger member and including a second bore extending generally centrally through said cushion block, said first bore and said cushion block being designed to resist turning of said block in said first bore,
    (d) a rod member extending through and of substantially the same configuration as said second bore and protruding from each end thereof, and
    (e) truck means secured to one end of said rod member for supportingly receiving axle and wheel means for said skate.

References Cited

UNITED STATES PATENTS

| 964,825 | 7/1910 | Vosseller | 280—11.26 |
| 978,523 | 12/1910 | Wanta | 280—11.28 |
| 1,578,811 | 3/1926 | Davis | 280—11.26 |
| 2,595,751 | 5/1952 | Balstad | 280—11.28 |

BENJAMIN HERSH, *Primary Examiner.*

MILTON L. SMITH, *Assistant Examiner.*